United States Patent
Kole

Patent Number: 5,810,281
Date of Patent: Sep. 22, 1998

[54] SPOOL ASSEMBLY WITH SLOTTED TUBES

[76] Inventor: John W. Kole, 3667 Dust Commander Dr., Indian Springs, Ohio 45011

[21] Appl. No.: 560,831

[22] Filed: Nov. 20, 1995

[51] Int. Cl.⁶ .................................................. B65H 75/28
[52] U.S. Cl. ................................... 242/532.6; 242/587.2; 242/609.1; 242/919; 4/502
[58] Field of Search ............................ 242/532.6, 587.2, 242/587.3, 546.1, 918, 919, 609, 609.1, 609.4, 587.1, 609.2, 609.3; 4/502, 498, 499; 138/109, 112, 152; 403/300, 305, 309, 310, 313; 464/179, 182, 88, 92, 147; 285/331, 369

[56] References Cited

U.S. PATENT DOCUMENTS

| | | | |
|---|---|---|---|
| 89,373 | 4/1869 | Abbott | 403/305 X |
| 2,141,107 | 12/1938 | Greulich | 403/300 X |
| 2,863,614 | 12/1958 | Dove | 242/587.2 |
| 3,447,674 | 6/1969 | Fraser . | |
| 3,484,121 | 12/1969 | Quinton | 403/305 X |
| 3,584,803 | 6/1971 | Williams . | |
| 3,610,288 | 10/1971 | Carr | 403/305 X |
| 3,726,320 | 4/1973 | Lachenmayer | 285/331 X |
| 3,885,751 | 5/1975 | Kelch et al. | 242/609 X |
| 3,979,782 | 9/1976 | Lamb | 4/502 |
| 3,995,897 | 12/1976 | Paskert | 403/300 X |
| 3,998,204 | 12/1976 | Fuchs et al. | 4/498 X |
| 4,195,622 | 4/1980 | Dolza et al. . | |
| 4,251,889 | 2/1981 | Lof | 4/498 |
| 4,324,370 | 4/1982 | Guard et al. . | |
| 4,328,930 | 5/1982 | Kalendovsky . | |
| 4,407,027 | 10/1983 | Colon, Jr. . | |
| 4,551,127 | 11/1985 | Rich et al. | 242/546.1 X |
| 4,628,549 | 12/1986 | Lazar | 4/498 |
| 4,955,092 | 9/1990 | Hagan . | |
| 5,107,552 | 4/1992 | Lavalliere et al. . | |
| 5,143,407 | 9/1992 | Cokeh | 285/331 X |
| 5,150,922 | 9/1992 | Nakashiba et al. | 285/331 X |
| 5,184,356 | 2/1993 | Löf et al. . | |
| 5,425,143 | 6/1995 | Kalendovsky . | |
| 5,474,501 | 12/1995 | Teng | 403/311 X |

FOREIGN PATENT DOCUMENTS

| | | | |
|---|---|---|---|
| 3010033 | 5/1993 | WIPO | 242/609.1 |

Primary Examiner—Daniel P. Stodola
Assistant Examiner—William A. Rivera
Attorney, Agent, or Firm—Steven J. Rosen

[57] ABSTRACT

A spool assembly upon which can be wound a sheet of material. The spool assembly having at least two tubes, each of the tubes having an annular tube wall with a tube slot along an entire length of the tube wall. The tubes are disposed in opposite ends of a connector, each in annular spaces between radially inner and outer annular connector walls of the connector. A more particular embodiment provides a solar pool cover assembly having a solar pool cover with a flexible sheet having bubbles and secured to the spool assembly. The tube slots have a gap that is sufficiently smaller than a height of the bubbles such that the bubbles cannot pass through the slots.

12 Claims, 3 Drawing Sheets

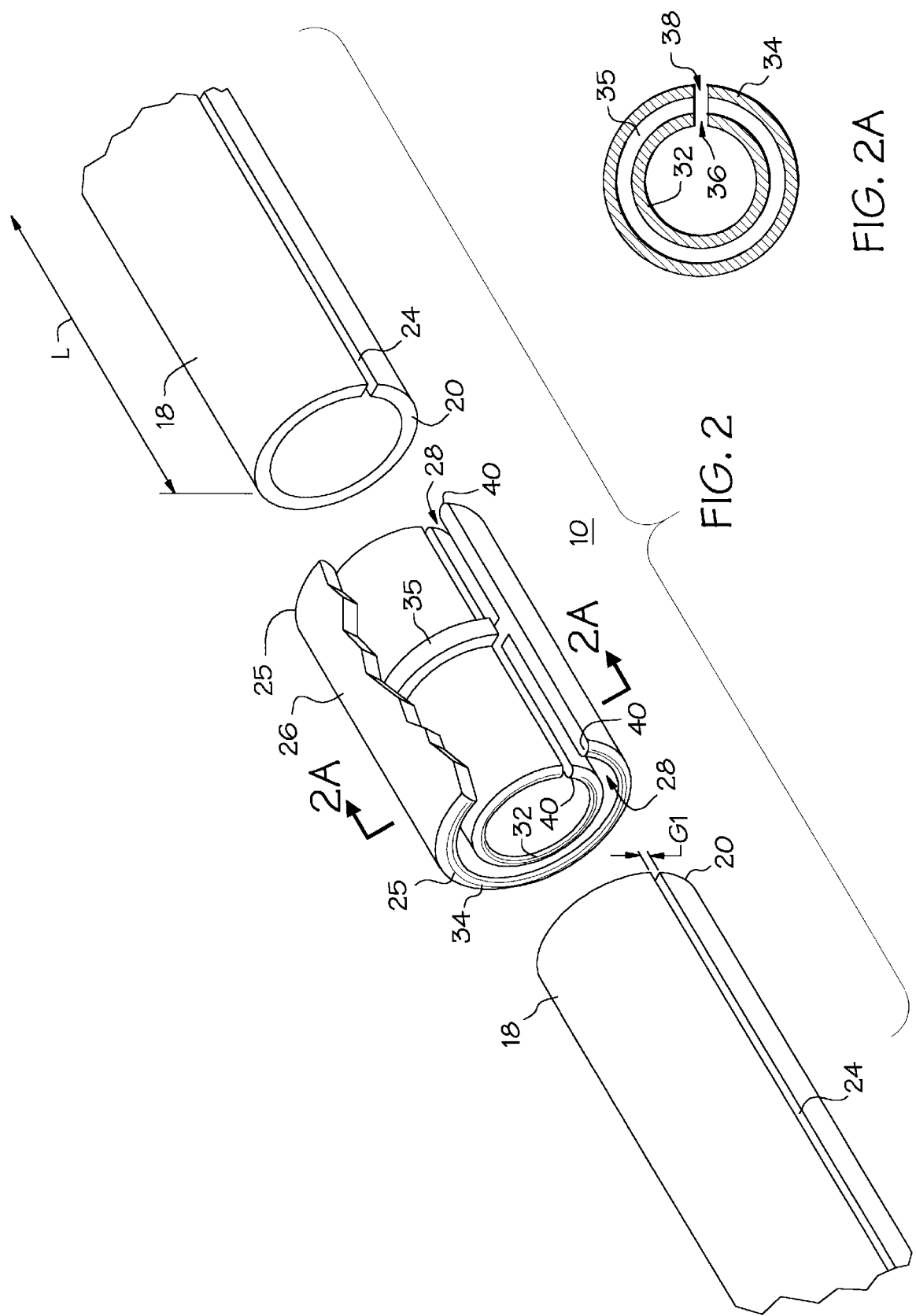

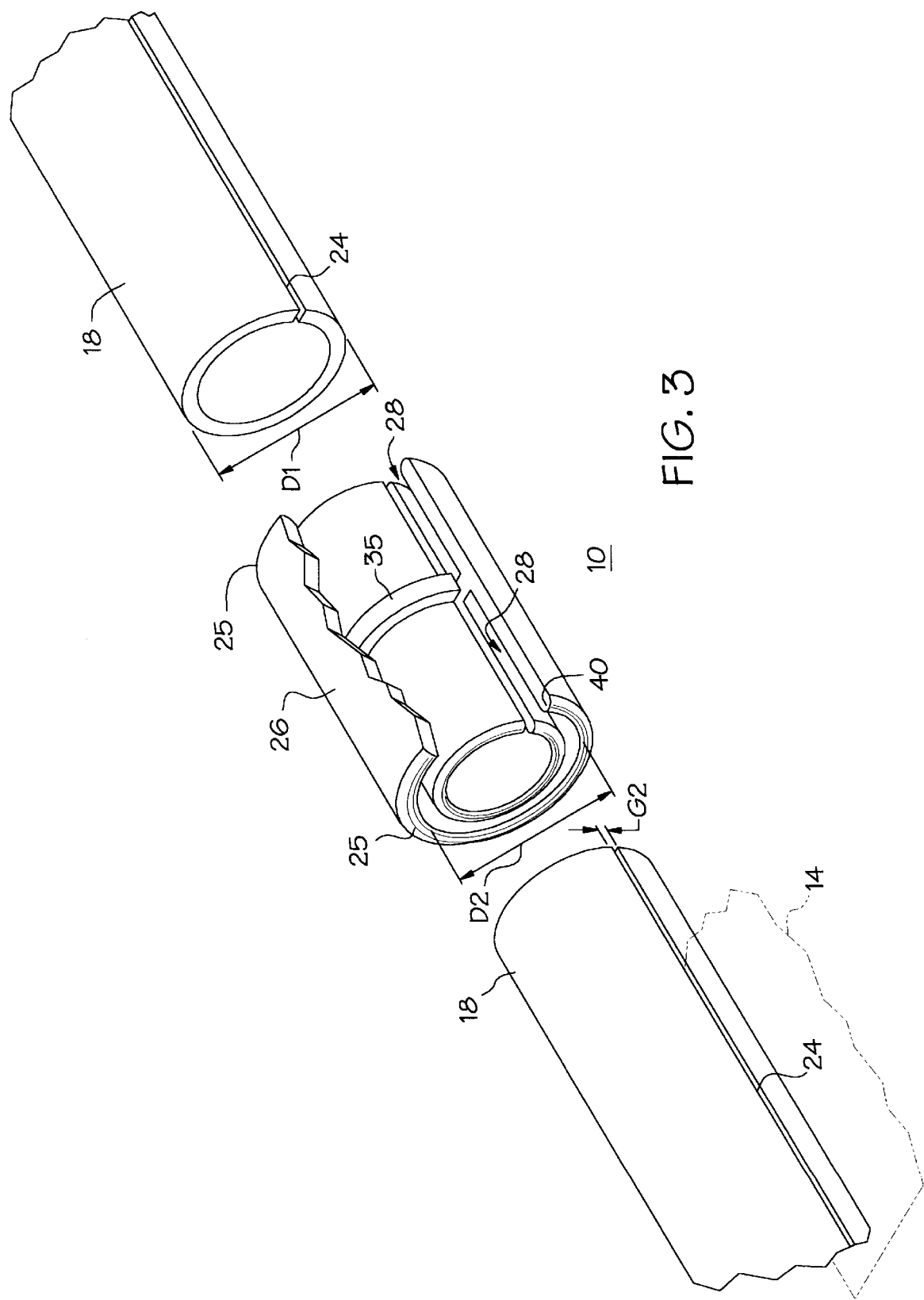

SPOOL ASSEMBLY WITH SLOTTED TUBES

BACKGROUND OF THE INVENTION

1. Field of the Invention

The present invention relates to spools used for winding and unwinding material onto it and, more particularly, to a spool that can secure and hold the material along the entire common length. One particular application is for winding and unwinding swimming pool solar covers.

2. Discussion of the Background Art

Many types of spools have been developed for winding material. Spools, typically, have securing devices for holding the material to the spool. Solar pool cover reels, one application of the present invention, are typically constructed of long spools or shafts between some type of support with clips to secure the cover or material to the spool. Such devices may be found in U.S. Pat. Nos. 4,328,930, 4,324,370, and 5,184,356. Great care must be taken to wind the spool so that the material winds up on the spool evenly between the ends of the spool. These clips are often used in conjunction with straps that are attached to the spool at one end of the strap and attached to the solar cover material at the other end of the strap. The solar cover material is a sheet of plastic with bubbles spaced close together such as the one described U.S. Pat. No. 4,407,027. It is difficult to align the sheet on the spool and great care must be taken to have the material wind up evenly on the spool. One of the reasons for the sheet becoming misaligned on the spool such that it does wind evenly is the difficulty in maintaining evenly distributed tension along the width of the sheet that is along the length of the spool. Pool cover reels, as they are often referred to, typically require side pieces to turn the spool or shaft and also guide the sheet of material onto the shaft evenly. It is difficult to evenly attach a sheet of solar cover to these types of shafts or spools and these reels are cumbersome and difficult to handle and move around. Furthermore, the reels are often cumbersome and unsightly to some people. They require space to be stored and often are stored in areas around inground and above ground pools such that they are a hazard to children who may be running around the pool as they often do.

Spools are used in various material winding applications and slots in the spool or shafts have been used to hold and secure the end of the sheet of material. An example of such slotted shafts for small shafts is illustrated in U.S. Pat. No. 3,584,803 for winding needlepoint canvas. U.S. Pat. No. 5,107,552 illustrates the use of a recess in a shaft that requires a snap in fastener to hold the sheet of material in the recess making attachment of the sheet difficult. Therefore, there is a need to provide a spool to wind up a solar cover or other material that provides for ease of attachment of the material to the shaft or spool, ease of rolling up the material, that is simple to use and construct, has a minimal number of parts and, is easy and safe to store and use.

SUMMARY OF THE INVENTION

A spool assembly upon which can be wound a sheet of material, the spool assembly having at least two tubes, each of the tubes having an annular tube wall with a tube slot along an entire length of the tube wall. The tubes are disposed in opposite ends of a connector, each in annular spaces between radially inner and outer annular connector walls of the connector. The connector walls have circumferentially aligned connector slots that are linearly alignable with the tube slots. More than two of the tubes and more than one connector may be used to form the spool such that one connector connects two of each of the tubes together. The tubes may be made of a waterproof material such as a polyvinyl chloride material or PVC piping.

A more particular embodiment provides a solar pool cover assembly having a solar pool cover comprising a flexible sheet of solar pool cover material having bubbles spaced close together and secured to a spool assembly such as is described above and further providing the tube slots a gap that is sufficiently smaller than a height of the bubbles such that the bubbles cannot pass through the slots.

An alternate embodiment provides a first outside diameter of the tubes, a second outside diameter of the annular spaces, such that the first outside diameter is slightly larger than the second outside diameter and the first outside diameter is sized such that the connector clamps the tube slot at least partially closed.

ADVANTAGES OF THE INVENTION

One advantage of the present invention is that it is easy to construct and has only two types of parts, slotted tubes and connectors. It is made of inexpensive and readily available materials and provides superior attachment of material and, in particular, a solar cover to a spool. The present invention has the advantage of attaching a material to a spool in an evenly distributed manner so as to provide an evenly distributed winding force and torque along the entire width of the material along the length of the spool and without any additional fasteners. The spool of the solar cover assembly of the present invention may be stored entirely in the pool with no parts out of the pool, thereby providing a distinct advantage of not posing a hazard to people and particularly children who may be walking or running around the pool. By being out of the way, it is also eliminates the unsightliness of the reel assemblies of conventional solar reels.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

FIG. 2 is an exploded partially cut away perspective view of connecting portions of the invention illustrated in FIG. 1;

FIG. 2A is an elevational view of the connector of the invention taken through 2A—2A in FIG. 2;

FIG. 3 is an exploded partially cut away perspective view of the connecting portions of an alternative embodiment of the invention illustrated in FIG. 1;

DETAILED DESCRIPTION

Figure 1:
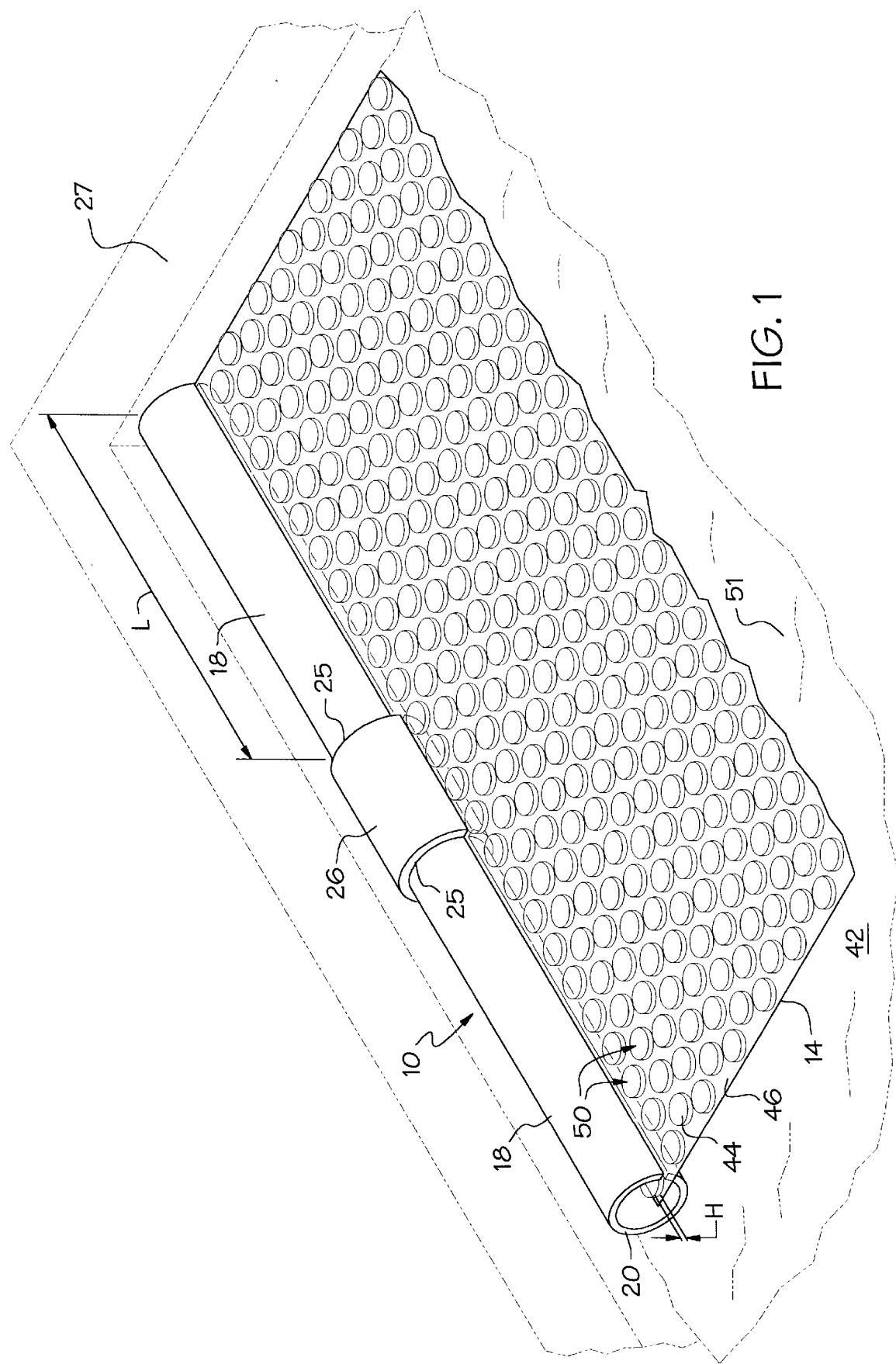
FIG. 1 is a perspective partially cut away view of an exemplary embodiment of the invention.

Referring now to the drawings in detail, wherein identical numerals indicate the same elements throughout the figures, FIGS. 1, 2 and 2A illustrate an exemplary embodiment of the present invention, a spool assembly 10 upon which can be wound a sheet of material 14, the spool assembly having at least two tubes 18, each of the tubes having an annular tube wall 20 with a tube slot 24 disposed entirely through and along an entire length L of the tube wall. The tubes 18 are disposed in opposite ends 25 of a connector 26, each in annular space 28 between radially inner and outer annular connector walls, 32 and 34, respectively of the connector. The inner and outer annular connector walls, 32 and 34, respectively are connected by an annular connector wall 35, and have circumferentially aligned connector inner and outer slots 36 and 38, respectively, that are linearly alignable with the tube slots 24. Snub nose or rounded edges 40 are provided on the inner and outer annular connector walls 32 and 34, respectively, at the ends 25 of the connector 26 to facilitate the insertion of the tubes 18 into the connector.

More than two of the tubes 18 and more than one connector 26 may be used to form the spool assembly 10 such that one connector connects two of each of the tubes together. The exemplary embodiment illustrated in FIG. 1 is a portion of a solar pool cover assembly 42 and the tubes 18 are preferably made of a material that is waterproof such as polyvinyl chloride (PVC). For example, five tubes 18 having a length L equal to about 4 feet are connected by connectors 26 that may be about 3 inches long for a 20 foot wide pool 27. Any combination may be constructed to achieve a desired length. The tubes 18 may be made from PVC piping having a 1 and 5/8 inch outside diameter. The solar pool cover assembly 42 includes a solar pool cover comprising a flexible sheet of material 14 (commonly available from pool and other stores, suppliers and manufactures of solar pool covers) having bubbles 44 extending upwards from a base 46 of the sheet of material 14 and which are spaced close together and disposed in offset rows 50 on the base. The bubbles 44 keep the spool assembly 10 afloat so that the assembly may be left in the water 51 of the pool 27. As can be seen in FIG. 1, the spool assembly 10 is safely out of the way and poses no danger to people walking and running near it.

The sheet of material 14 is secured to the spool assembly 10 by having one or more of the rows 50 of bubbles 44 being located inside the annular tube wall 20 and providing the tube slot 24 with a first gap G1 that is sufficiently smaller than a height H of the bubbles so that the rows are trapped inside of the annular tube wall unable to pass through the tube slot. The sheet of material 14 may be slid through the tube slots 24 either before or after assembly of the tubes 18 in the opposite ends 25 of the connectors 26, the first gap G1 being sized so as to not clamp down or at least not too hard on the base 46 of the sheet of material 14 and not prevent the base from being slid through the slots.

The spool assembly of the present invention may be used with crank and handles or wheels mounted on a pedestal such as shown in the prior art, e.g. U.S. Pat. No. 4,324,370 which is incorporated herein by reference. This embodiment offers an easy means of attaching the solar pool cover sheet of material 14 to the spool assembly 10.

An alternate embodiment illustrated in FIG. 3 provides the tubes 18 with a first outside diameter D1 and the annular spaces 28 between radially inner and outer annular connector walls 32 and 34, respectively of the connector 26 with a second outside diameter D2 of the annular spaces, such that the first outside diameter is slightly larger than the second outside diameter and the first outside diameter is sized such that the connector clamps the tube slot at least partially closed. The snub nose or rounded edges 40 help to guide and facilitate the insertion of the tubes 18 into the annular spaces of the connector. Note then that a second gap G2 is smaller than the gap G1 in the prior embodiment and that the sheet of material 14 is clamped in place. Also note that the clamping force may be controlled by sizing of the elements of the tubes 18 and connector 26. A moderate amount of clamping force may be produced by suitably designing the elements and in particular their dimensions so as, for example, to hold the sheet yet allow it to be slid through the tube slots 24 even when the spool assembly 10 is fully or partially assembled, i.e. when the tubes 18 are inserted in the connectors 26.

While the preferred embodiment of our invention has been described fully in order to explain its principles, it is understood that various modifications or alterations may be made to the preferred embodiment without departing from the scope of the invention as set forth in the appended claims.

I claim:

1. A spool assembly for winding up a sheet of material, said spool assembly comprising:

at least two tubes, each of said tubes having an annular tube wall with a tube slot disposed entirely through and along an entire length of said tube wall, a connector having opposite ends with annular spaces between radially inner and outer annular connector walls of said connector and each of said tubes disposed in said annular spaces, and said connector walls having circumferentially aligned connector slots that are linearly alignable with said tube slots.

2. A spool assembly as claimed in claim 1 further comprising rounded edges on said inner and outer annular connector walls at said opposite ends of said connector.

3. A spool assembly as claimed in claim 2 further comprising more than two of said tubes and more than one connector such that one connector connects two of each of said tubes together.

4. A spool assembly as claimed in claim 3 wherein said tubes are made of a waterproof material.

5. A spool assembly as claimed in claim 4 wherein said tubes are made of a polyvinyl chloride material.

6. A spool assembly as claimed in claim 1 further comprising;

a first outside diameter of said tubes, a second outside diameter of said annular spaces, and wherein said first outside diameter is slightly larger than said second outside diameter and said first outside diameter is sized such that said connector clamps said tube slot at least partially closed.

7. A solar pool cover assembly comprising:

a solar pool cover comprising a flexible sheet of solar pool cover material having bubbles spaced close together and a spool assembly for winding up said solar pool cover, said spool assembly comprising;

at least two tubes, each of said tubes having an annular tube wall with a tube slot disposed entirely through and along an entire length of said tube wall, a connector having opposite ends with annular spaces between radially inner and outer annular connector walls of said connector, said connector walls having circumferentially aligned connector slots that are linearly alignable with said tube slots, and each of said tubes disposed in one of said annular spaces, an edge of said flexible sheet disposed through said slots in said tubes, and said tube slots having a gap that is sufficiently smaller than a height of the bubbles such that the bubbles cannot pass through said slots.

8. A spool assembly as claimed in claim 7 further comprising rounded edges on said inner and outer annular connector walls at said opposite ends of said connector.

9. A solar pool cover assembly as claimed in claim 8 further comprising more than two of said tubes and more than one connector such that one connector connects each two of said tubes together.

10. A solar pool cover assembly as claimed in claim 9 wherein said connectors and said tubes are made of a waterproof material.

11. A solar pool cover assembly as claimed in claim 10 wherein said tubes are made of a polyvinyl chloride material.

12. A solar pool cover assembly as claimed in claim 11 wherein said tubes are made of a polyvinyl chloride piping.

* * * * *